(12) United States Patent
Toft

(10) Patent No.: US 12,160,715 B2
(45) Date of Patent: Dec. 3, 2024

(54) MICROPHONE ASSEMBLY WITH IMPROVED STARTUP SETTLING

(71) Applicant: Knowles Electronics, LLC, Itasca, IL (US)

(72) Inventor: Jakob Kenn Toft, København (DK)

(73) Assignee: Knowles Electronics, LLC, Itasca, IL (US)

( * ) Notice: Subject to any disclaimer, the term of this patent is extended or adjusted under 35 U.S.C. 154(b) by 260 days.

(21) Appl. No.: 17/962,409

(22) Filed: Oct. 7, 2022

(65) Prior Publication Data

US 2023/0115233 A1 Apr. 13, 2023

Related U.S. Application Data

(60) Provisional application No. 63/253,896, filed on Oct. 8, 2021.

(51) Int. Cl.

| | |
|---|---|
| *H04R 3/04* | (2006.01) |
| *H02M 1/44* | (2007.01) |
| *H02M 3/07* | (2006.01) |
| *H04R 1/04* | (2006.01) |
| *H04R 19/04* | (2006.01) |

(52) U.S. Cl.
CPC ............... *H04R 3/04* (2013.01); *H02M 1/44* (2013.01); *H02M 3/07* (2013.01); *H04R 1/04* (2013.01); *H04R 19/04* (2013.01); *H04R 2201/003* (2013.01)

(58) Field of Classification Search
CPC . H04R 3/04; H04R 1/04; H04R 19/04; H04R 2201/003; H02M 1/44; H02M 3/07; H02M 1/36; H02M 1/143; H02M 1/15; H02M 3/073; H02M 3/077
See application file for complete search history.

(56) References Cited

U.S. PATENT DOCUMENTS

| | | | | |
|---|---|---|---|---|
| 8,917,136 | B1 * | 12/2014 | Pelley | H02M 3/07 |
| | | | | 327/536 |
| 9,444,404 | B2 * | 9/2016 | Opris | H03F 1/00 |
| 10,523,162 | B2 * | 12/2019 | Albers | H04R 3/04 |
| 10,623,867 | B2 * | 4/2020 | Evans | H04R 19/005 |
| 11,363,387 | B2 * | 6/2022 | Littrell | H04R 17/02 |
| 2008/0042759 | A1 * | 2/2008 | Watanabe | H03L 7/093 |
| | | | | 331/17 |
| 2018/0012588 | A1 * | 1/2018 | Albers | H03F 3/45475 |
| 2018/0332377 | A1 * | 11/2018 | Polo | H03F 3/505 |
| 2019/0081598 | A1 * | 3/2019 | Albers | H03F 3/187 |
| 2019/0324491 | A1 * | 10/2019 | Zou | H04R 1/04 |

* cited by examiner

*Primary Examiner* — Akelaw Teshale
(74) *Attorney, Agent, or Firm* — Hickman Becker Bingham Ledesma LLP; Matthew C. Loppnow

(57) ABSTRACT

The disclosure relates to a transducer assembly like a microphone including a bias circuit having a charge pump and a filter circuit coupled to a transducer. The filter circuit includes a voltage-controlled resistor located between an output of the charge pump and the transducer, and a capacitor coupled to the voltage-controlled resistor opposite the charge pump, wherein the bias circuit is configured with a larger bandwidth for faster settling during transient operation than during steady-state operation.

21 Claims, 3 Drawing Sheets

MICROPHONE ASSEMBLY WITH IMPROVED STARTUP SETTLING

FIELD OF THE DISCLOSURE

The present disclosure relates generally to transducer assemblies, and more particularly to transducer assemblies comprising a bias circuit having a filter circuit coupled to a transducer, bias circuits for transducer assemblies, and methods therein.

BACKGROUND

Microelectromechanical systems (MEMS) transducers are increasingly used in all manner of applications for their small size, low cost, reasonably high sensitivity and signal-to-noise ratio (SNR), and the ability to readily integrate them in host devices and systems. MEMS transducers are commonly implemented as a sensor for detecting sound in wireless handsets, laptop computers, smart speakers, wireless earphones, headsets, appliances and automobiles, among a variety of other consumer and industrial goods and machinery. In many of these and other sensors the MEMS motor is biased by a bias circuit comprising a multi-stage charge pump and a two-stage low pass output filter with a bandwidth in the millihertz (mHz) range, which is extremely narrow. Such a narrow filter bandwidth provides good noise attenuation but is unsuitable for next-generation transducers that require a much larger bandwidth for transient operations like start-up, shock recovery, etc.

BRIEF DESCRIPTION OF THE DRAWINGS

The objects, features and advantages of the present disclosure will become more fully apparent from the following detailed description and the appended claims considered in conjunction with the accompanying drawings. The drawings depict only representative embodiments and are therefore not considered to limit the scope of the disclosure.

Those of ordinary skill in the art will appreciate that the drawings are illustrated for simplicity and clarity and therefore may not be drawn to scale and may not include well-known features, that the order of occurrence of actions or steps may be different than the order described or may be performed concurrently unless specified otherwise, and that the terms and expressions used herein have the meaning understood by those of ordinary skill in the art except where different meanings are attributed to them herein.

DETAILED DESCRIPTION

The present disclosure relates to transducer assemblies comprising a bias circuit including a filter circuit coupled to a transducer, bias circuits for transducer assemblies, and methods therein. The bias circuit comprises one or more cascaded charge pump stages and a filter circuit including one or more filter stages coupled to a last stage of the charge pump. The filter stage comprises a voltage-controlled resistor between an output of the charge pump and an output of the filter circuit, and a capacitor coupled to the voltage-controlled resistor, opposite the output of the filter circuit. The voltage-controlled resistor can be implemented as a transistor or other voltage-controlled resistance device. A voltage reference circuit provides a fixed or variable reference voltage to the voltage-controlled resistor depending on the implementation of the filter circuit. A bandwidth of the bias circuit is adaptively configured to control settling time based on whether the sensor is operating in a transient or steady-state mode. The bandwidth can be defined by one or more cutoff frequencies of the filter circuit.

In a representative implementation, the bias circuit has a larger bandwidth (and shorter settling time) during transient operation than during steady-state operation. Transient operation includes initialization or start-up of the transducer assembly, during which a movable member of some transducers is electrostatically biased or positioned for steady-state operation. Other transient operations include recovery from shock events and suppression of disturbances that include in-band or out-of-and frequency content that can overload the sensor or otherwise interference with in-band signal processing. Such disturbances can result from door slams, wind noise, etc. In one representative use case, the bandwidth of the bias circuit is 1 Hz or less for steady state operation and up to 1 kHz or more for certain transient operations. These representative bandwidths are non-limiting and depend generally on transducer architecture, use case requirements (e.g., sensor type), and the nature of the disturbance. For example, the bandwidth during steady-state operation of sensors having a transducer devoid of a barometric pressure relief vent may be selected to compensate for changes in barometric pressure. These and other aspects of the disclosure are described more fully herein.

Figure 1:
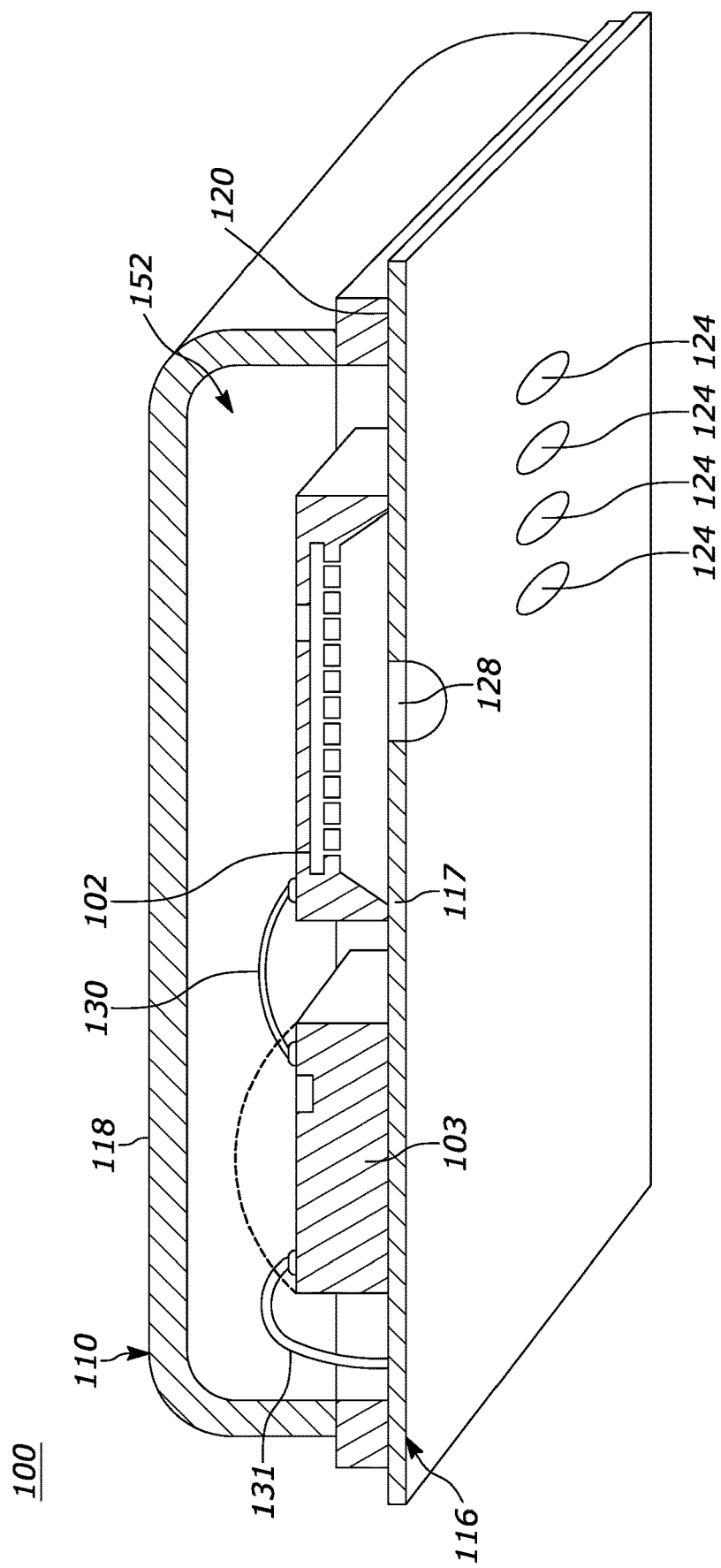
FIG. 1 is a sectional view of a representative transducer assembly.

FIG. 1 is a cross-sectional view of a representative transducer assembly 100 comprising a transduction element (also referred to as a "transducer" herein) configured as a MEMS motor 102 coupled to an electrical circuit 103 disposed within a housing 110. The electrical circuit can be implemented as one or more integrated circuits, e.g., ASICS. The housing can include a base 116 and a cover 118 fastened to an upper surface 120 thereof. In some implementations, the housing shields the transduction element and the electrical circuit located within an interior 122 of the housing from electromagnetic interference, like RF noise. For this purpose, the cover can be metal. Alternatively, the cover can be a non-conductive material like plastic or FR4 comprising a conductive film or other conductive layer electrically coupled to a conductive portion (e.g., a ground plane) of the base. The housing can also include an external interface with contacts (e.g., supply, ground, data, clock, select, etc.) configured to interface with a host or other device. The external interface can be configured for reflow soldering, through-hole mounting or wire-bonding, among other known and future integration processes. In FIG. 1, the transducer assembly is a surface-mount device comprising a host-interface including electrical contacts 124 (e.g., GRND, PWR, Data, CLK, Select . . . ) located on an outer surface 117 of the base 116. The electrical circuit 103 is coupled to the transducer 102 via lead 130 and to contacts on the host-interface via leads 131 electrically connected to traces (not shown) embedded in the base for this purpose. The electrical circuit can obtain power, clock and other signals from the contacts on the host-interface. Other transducer assemblies can be configured differently depending on the function performed and the use case.

In one embodiment, the transducer assembly is a microphone configured to produce an electrical signal representative of acoustic signals propagated through the atmosphere and detected by the transducer within the housing. In microphones and possibly other sensor assemblies the housing can include an aperture (also referred to herein as a "sound port" or "port") connecting the interior of the housing to the external environment. In FIG. 1, the port 128 is located on the base 116 in alignment with the transducer 102. In other transducer assemblies, the port can be on some other part of the housing. In top-port microphone assemblies, the sound port is located on the cover. In others, the port can be located on a side portion of the assembly.

In other embodiments, the transducer assembly is configured to generate an electrical signal representative of vibrations or forces detected by the transducer. For example, the transducer assembly can be configured to detect acoustic vibrations that propagate through an animate (e.g., a person) or an inanimate object. The acoustic vibration sensor can also be used in combination with a microphone that detects acoustic signals propagated through the air. Other transducer assemblies can be configured to detect pressure, acceleration, humidity, or temperature, among other conditions alone or in combination with sound or vibration detection. A sound port may not be required in other sensor assemblies, like acoustic vibration sensors and accelerometers, among others. In other implementations, the transducer assembly can be a sound-producing speaker or other actuator that responds to an electrical excitation signal.

The transducer assembly generally comprises a desired bandwidth depending on its type, configuration and use case. For example, microphone sensors typically have a desired bandwidth in the human audible range, between roughly 20 Hz and 20 kHz or higher. The desired bandwidth of some microphones and ultrasonic transducers extend above and beyond the audible range, and the desired bandwidth of vibration sensors typically extends below the audible range. Other transducer assemblies can have other bandwidths suitable for the intended use case.

Representative transducer elements suitable for use in transducer assemblies of the types described herein include capacitive, piezoelectric and optical transducers, among others. In sensor applications, the transducer generates an electrical signal in response to displacement or deflection of a movable member. In actuator applications, the transducer drives the movable member in response to an applied electrical signal. Some transducers comprises one or more electrodes movable relative to one or more fixed electrodes or dielectrics. The electrodes can assume different structural forms including a diaphragm movable relative to a back plate, fixed and movable electrodes having interdigitated fingers, among others. A piezoelectric transducer generally comprises a movable (e.g., flexible) member formed of or including a piezoelectric material. These and other transducers can be implemented as a microelectromechanical systems (MEMS) motor, among other known and future devices.

Figure 2:
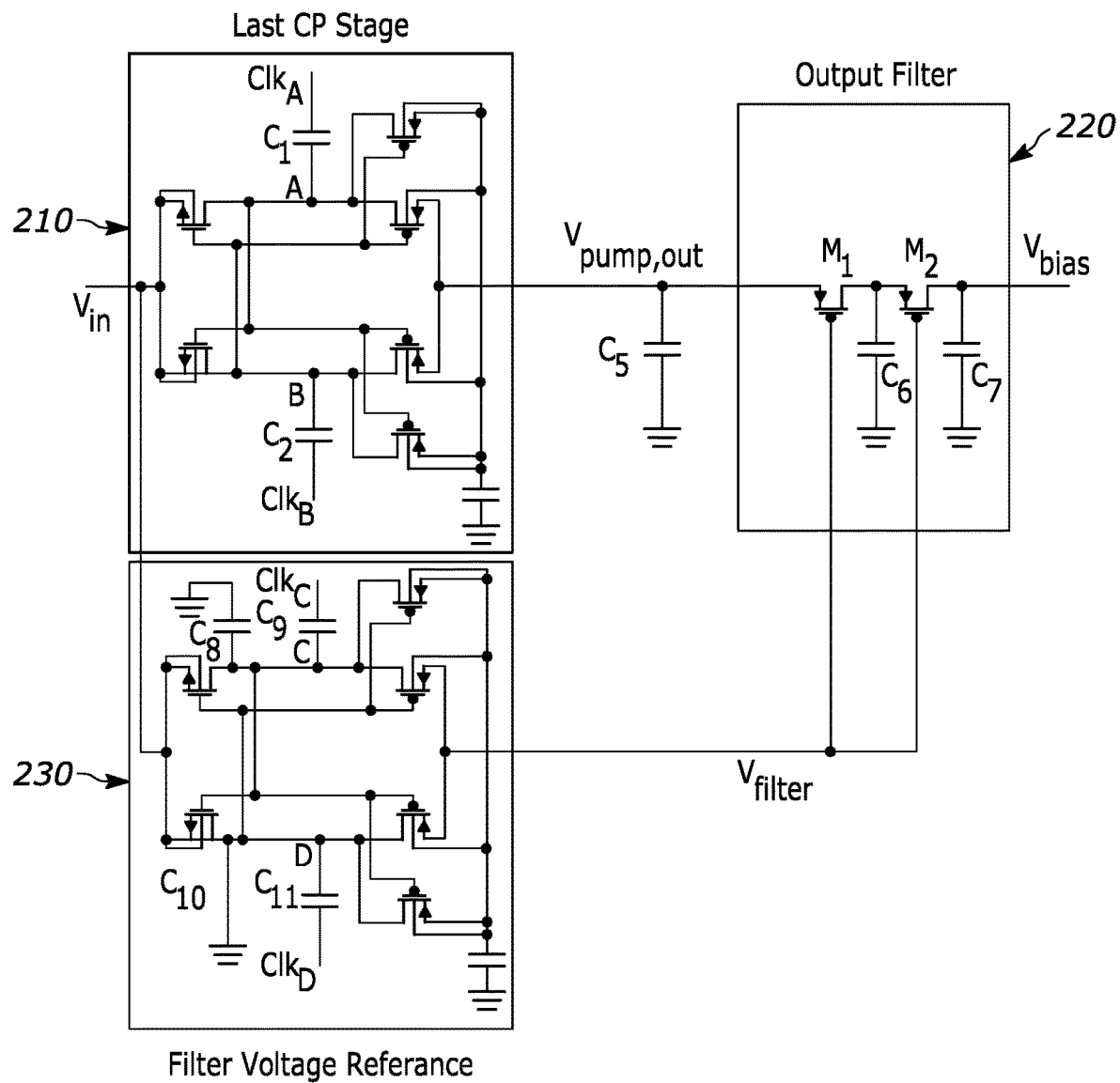
FIG. 2 is a schematic block diagram of a representative bias circuit.
Figure 3:
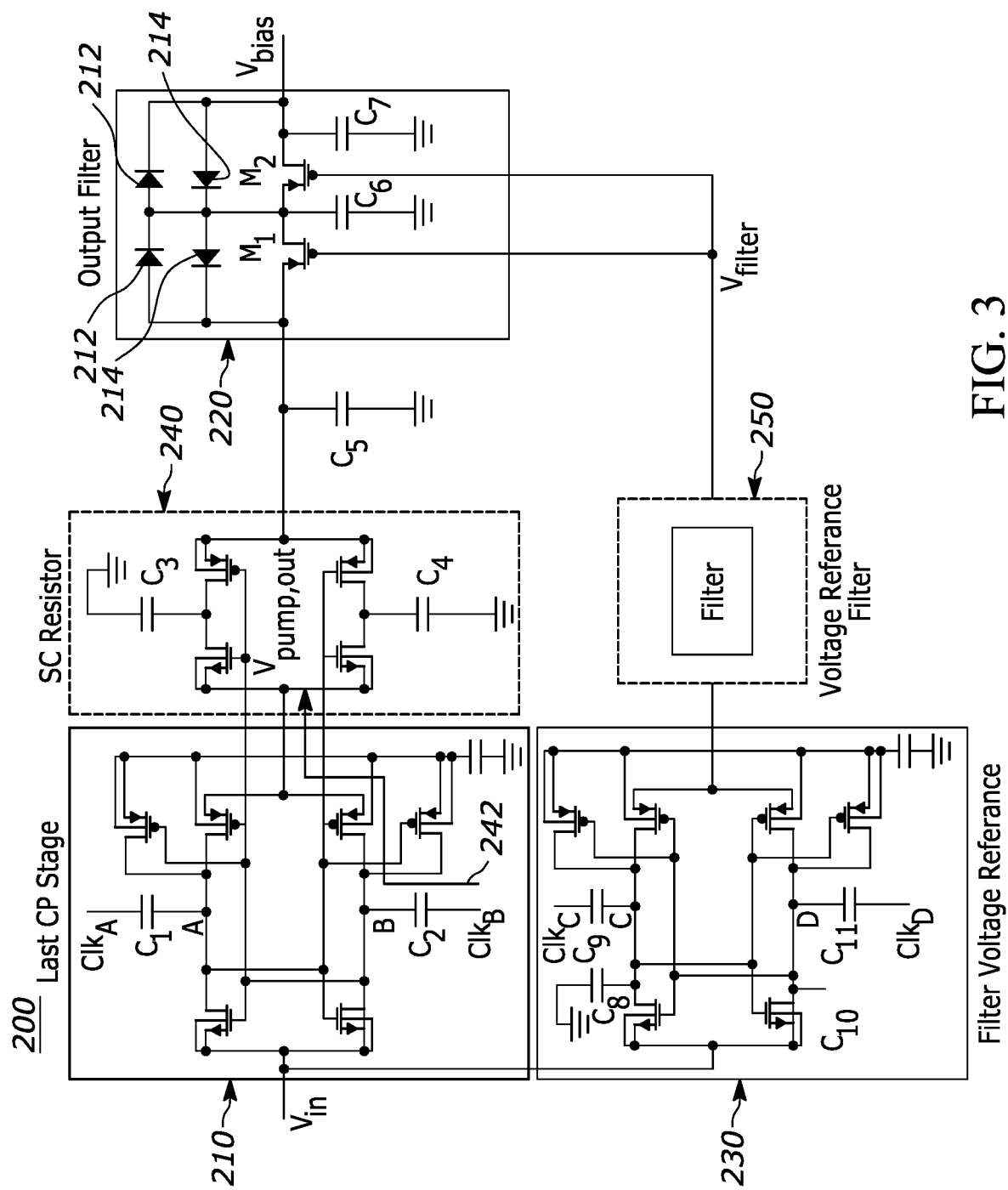
FIG. 3 is a schematic block diagram of an alternative bias circuit.

The bias circuit generally comprises one or more cascaded charge pump stages and can be configured for bidirectional or unidirectional transfer of charge to and from the transducer. These and other charge pumps can be clocked by one or more clock signals. In FIGS. 2 and 3, a representative bias circuit 200 comprises a charge pump stage 210 that can be a sole charge pump or the last of two or more cascaded charge pump stages. The charge pump includes an input for receiving an input voltage $V_{in}$ from a reference voltage source or an output of an upstream charge pump stage (not shown). The representative charge pump 210 is clocked by out-of-phase (non-overlapping) clock signals $Clk_A$ and $Clk_B$ and is capable of bidirectional charge transfer. The gain of the charge pump resulting in an output voltage $V_{pump\_out}$ can be based on an amplitude of the clock signals or some other parameter of the charge pump. The representative charge pump of FIGS. 2 and 3 is one of a variety of alternative topologies suitable for biasing a MEMs motor or other transducer contemplated by the present disclosure. The charge pump may use any switched capacitor circuit topology capable of boosting the input voltage to a higher voltage.

A filter circuit is coupled between the charge pump and the transducer of the transducer assembly. The filter circuit generally comprises a single filter stage or multiple cascaded filter stages configured as a low-pass, band-pass, high-pass or other filter topology. In FIG. 2, the representative filter circuit 220 comprises a first filter stage including a voltage-controlled resistor $M_1$ coupled to an output of the charge pump stage 210 and to an output $V_{bias}$ of the filter circuit. The first filter stage also comprises a capacitor $C_6$ coupled to the voltage-controlled resistor $M_1$, opposite the charge pump 210. The filter circuit 220 also comprises a second filter stage including a voltage-controlled resistor $M_2$ between an output of the first filter stage and the output $V_{bias}$ of the filter circuit. The second filter stage includes a capacitor $C_7$ coupled to the voltage controlled-resistor $M_2$, opposite the voltage-controlled resistor $M_1$, and to the output of the filter circuit. The filter circuit can include additional filter stages if higher order filtering is desired. A capacitor $C_5$ upstream of the first filter stage smooths the charge pump output voltage $V_{pump\_out}$. The smoothing capacitor $C_5$ can be integrated with the filter circuit or the charge pump, and is optional. $M_1$ and $M_2$ can be implemented as transistors as described further herein.

A voltage reference circuit applies a fixed or variable reference voltage to the voltage-controlled resistor. In FIGS. 2 and 3, a voltage reference circuit 230 comprises a voltage output coupled to the voltage-controlled resistors $M_1$ and $M_2$ for this purpose. The representative voltage reference circuit 230 of FIGS. 2 and 3 is one of a variety of alternative circuit topologies suitable for generating a variable or fixed voltage signal applied to the voltage-controlled resistors of the filter circuit.

In the implementation of FIG. 2, a bandwidth of the bias circuit is adaptively configured for transient and steady-state operation by enabling the voltage-controlled resistors $M_1$ and $M_2$ with a variable voltage $V_{filter}$ from the voltage reference circuit 230. In a representative implementation, the bias circuit has a larger bandwidth (and shorter settling time) during transient operation than during steady-state operation. The voltage $V_{filter}$ provided to the voltage-controlled resistors is different than the output voltage $V_{pump\text{-}out}$ of the charge pump to enable as described further herein. The variable voltage $V_{filter}$ can be based on the voltage $V_{in}$ as described further herein. Alternatively, the variable voltage $V_{filter}$ can be based on some other voltage source like an output voltage of an upstream charge pump stage, among other possible sources. The voltage $V_{filter}$ provided to the voltage-controlled resistors can be continuously variable or can transition between two or more discrete states depending on whether operation is transient or steady-state.

Generally, the output voltage of the voltage reference circuit can be controlled by changing an amplitude or frequency of a clock signal, or a capacitance, or some other parameter of the voltage reference circuit. In FIG. 2, according to one implementation, the voltage $V_{filter}$ on the output of the voltage reference circuit 230 can be controlled by changing an amplitude of the clock signals $Clk_C$ and $Clk_D$ of the voltage reference circuit relative to $Clk_A$ and $Clk_B$ of the charge pump 210. In another implementation, the voltage $V_{filter}$ of the voltage reference circuit 230 can be controlled by changing a capacitance of one or more of the capacitors $C_8$-$C_{11}$. For example, one or more of the capacitors $C_8$-$C_{11}$ can be configured as a variable capacitors implemented as a switchable capacitance bank. In another alternative implementation, the amplitude of the voltage $V_{filter}$ can be varied by adjusting the frequency or duty cycle of the clock signals $Clk_C$ and $Clk_D$ of the voltage reference source 230.

In the implementation of FIG. 3, a bandwidth of the bias circuit is adaptively configured for transient and steady-state operation by reverse-polarity diodes arranged in parallel with the voltage-controlled resistor enabled by a fixed output voltage $V_{filter}$ from the voltage reference circuit. The fixed output voltage $V_{filter}$ of the voltage reference circuit is different than the output voltage $V_{pump\_out}$ of the charge pump as described further herein. In a representative implementation, the bias circuit has a larger bandwidth (and shorter settling time) during transient operation than during steady-state operation.

In FIG. 3, the representative filter circuit 220 comprises first and second cascaded filter stages disposed between an output of the charge pump stage and an output $V_{bias}$ of the filter circuit. The first filter stage comprises parallel diodes 212 and 214 arranged with reversed-polarity in parallel with a voltage-controlled resistor $M_1$. The first filter stage also comprises a capacitor $C_6$ coupled to the voltage-controlled resistor $M_1$, opposite the charge pump 210. The second filter stage also comprises parallel diodes 212 and 214 arranged with reversed-polarity in parallel with a voltage-controlled resistor $M_2$ between an output of the first filter stage and the output $V_{bias}$ of the filter circuit. The second filter stage also comprises a capacitor $C_7$ coupled to the voltage controlled-resistor $M_2$, opposite the voltage-controlled resistor $M_1$, and to the output of the filter circuit. The filter circuit can include additional filter stages if higher order filtering is desired. The capacitor $C_5$ upstream of the first filter stage smooths the charge pump output voltage $V_{pump\_out}$ and is optional.

In FIGS. 2 and 3, the representative charge pump 210 and voltage reference circuit 230 are arranged in parallel and have substantially the same topology, except that the gains are different due to the addition of capacitors $C_8$ and $C_{10}$ in the voltage reference circuit. A common signal $V_{in}$ is applied to charge pump stage and to the voltage reference circuit, but the charge pump output $V_{pump\_out}$ is different than the output $V_{filter}$ of the voltage reference circuit due to the different gains. The signal $V_{in}$ can be from an upstream charge pump stage or from another reference voltage source for the case of a single-stage charge pump. Alternatively, the circuit topology of the voltage reference circuit can be different from that of the charge pump and the circuits need not be connected in parallel, wherein input voltages applied to the charge pump and to the voltage reference circuit are from different sources. Whether the output voltage of the charge pump is more or less than the output voltage of the voltage reference circuit depends on the implementation of the voltage-controlled resistor as described further herein.

In FIGS. 2 and 3, the voltage-controlled resistor is a metal-oxide-semiconductor (MOS) device comprising a gate coupled to the output voltage $V_{filter}$ of the voltage reference circuit. The MOS device also includes a source and drain coupled between the output voltage $V_{pump\_out}$ of the charge pump and the output $V_{bias}$ of the filter circuit. To enable PMOS devices, the output voltage $V_{filter}$ of the voltage reference circuit 230 must be less than the output voltage $V_{pump\_out}$ of the charge pump 210. The output voltage $V_{filter}$ of the voltage reference circuit biases PMOS transistor with a voltage that results in a resistance between the source and drain sufficient to provide a low bandwidth for steady-state operation. In one PMOS implementation, the bias voltage $V_{filter}$ is between 50 mV and 300 mV less than $V_{filter}$. For example, $V_{filter}$ can be about 49.7 V and $V_{pump\_out}$ can be about 50.0 V. To enable NMOS devices, the output voltage $V_{filter}$ of the voltage reference circuit must be greater than the output voltage $V_{pump\_out}$ of the charge pump. Where the last charge pump stage is arranged in parallel with the voltage reference circuit, the gain of the charge pump is greater than the gain of the voltage reference circuit for PMOS devices and vice-versa for NMOS devices.

In FIG. 3, the bandwidth of the bias circuit is predominately attributable to the parallel diodes during transient operation and the bandwidth is predominately attributable to the MOS devices during steady-state operation. During transient operation like start-up, the resistance of the parallel diodes is low relative to the MOS devices when the voltage across the parallel diodes is large and the bias circuit has a large bandwidth (fast settling). During steady-state operation, the resistance of the parallel diodes is large relative to the MOS devices and the bias circuit has a relatively small bandwidth (slow settling).

In some implementations, an AC blocking circuit is optionally disposed between filter circuit and the last charge pump stage. In FIG. 3, a switched-capacitor (SC) resistor circuit 240 is located between the output of the charge pump stage 210 and the input to the filter circuit 220. The SC resistor circuit can block AC noise generated by the charge pump from passing to the filter circuit 220. Such noise can be high frequency noise 242 from clock signals $Clk_A$ and $Clk_B$ or some other noise. The charge pump output voltage $V_{pump\_out}$ will drop slightly across the SC resistor circuit to $V'_{pump\_out}$ depending on the circuit topology of the SC resistor circuit. Optionally, an AC blocking circuit 240 can also be disposed between the output of the voltage reference circuit 230 and the filter circuit 220 (e.g., for blocking high frequencies from clock signals $Clk_C$ and $Clk_D$). Other filter circuits can also be located between the filter circuit 220 and the charge pump 210 and voltage reference circuit 230. In FIG. 3, for example, a noise filter 250 is located between the voltage reference circuit 230 and the filter circuit. The noise filter 250 can be configured to filter low frequencies and can be used alone or in combination with the SC resistor circuit.

While the disclosure and what is presently considered to be the best mode thereof has been described in a manner establishing possession and enabling those of ordinary skill in the art to make and use the same, it will be understood and appreciated that there are many equivalents to the select embodiments described herein and that myriad modifications and variations may be made thereto without departing from the scope and spirit of the invention, which is to be limited not by the embodiments described herein but by the appended claims and their equivalents.

What is claimed is:

1. A transducer assembly comprising:
   a transducer configured to produce an electrical signal in response to a mechanical stimulus;
   an electrical circuit comprising:
      a bias circuit comprising a charge pump and a filter circuit having an output coupled to the transducer, the filter circuit comprising a voltage-controlled resistor between an output of the charge pump and the output of the filter circuit, the filter circuit comprising a capacitor coupled to the voltage-controlled resistor opposite the charge pump;
      a voltage reference circuit having an output coupled to the voltage-controlled resistor, wherein the bias circuit is configured with a larger bandwidth during transient operation of the transducer assembly than during steady-state operation of the transducer assembly.

2. The transducer assembly of claim 1, the filter circuit further comprising parallel diodes arranged with reversed-polarity in parallel with the voltage-controlled resistor, wherein the bandwidth is predominately attributable to the parallel diodes during transient operation and the bandwidth is predominately attributable to the voltage-controlled resistor during steady-state operation.

3. The transducer assembly of claim 2 further comprising a switched-capacitor resistor circuit disposed between the output of the voltage reference circuit and the voltage-controlled resistor, wherein the switched-capacitor resistor circuit suppresses AC noise from the voltage reference circuit to the filter circuit.

4. The transducer assembly of claim 1, the voltage reference circuit arranged in parallel with the charge pump and configured to provide a fixed reference voltage to the voltage-controlled resistor, wherein a gain of the voltage reference circuit is different than a gain of the charge pump.

5. The transducer assembly of claim 4, the bias circuit having a first settling time during transient operation and the bias circuit having a second settling time during steady-state operation, wherein the first settling time is less than the second settling time.

6. The transducer assembly of claim 5, the voltage-controlled resistor comprising a PMOS device having a gate coupled to the output of the voltage reference circuit, the PMOS device having a source and drain coupled between the output of the charge pump and the output of the filter circuit, wherein the gain of the voltage reference circuit is less than the gain of the charge pump.

7. The transducer assembly of claim 1 further comprising a switched-capacitor resistor circuit disposed between the output of the charge pump and the filter circuit, wherein the switched-capacitor resistor circuit suppresses AC noise from the charge pump to the filter circuit.

8. The transducer assembly of claim 1, the voltage reference circuit configured to provide variable reference voltage on its output based on an amplitude of a clock signal of the voltage reference circuit, wherein the variable reference voltage has a first value during transient operation and a second value during steady-state operation.

9. The transducer assembly of claim 1, the voltage reference circuit configured to generate variable reference voltage on its output based on a variable capacitance of the voltage reference circuit, wherein the variable reference voltage has a first value during transient operation and a second value during steady-state operation.

10. A transducer assembly comprising:
a MEMS motor comprising a movable element and configured to produce an electrical signal in response to actuation of the movable element;
a DC bias circuit comprising a charge pump having an output coupled to a filter circuit, the filter circuit having an output coupled to the MEMS motor, the filter circuit comprising a voltage-controlled resistor between an output of the charge pump and the output of the filter circuit, the filter circuit comprising a capacitor coupled to the voltage-controlled resistor opposite the charge pump; and
a voltage reference circuit having an output coupled to the voltage-controlled resistor,
wherein a settling time of the bias circuit is faster during transient operation of the transducer assembly than during steady-state operation of the transducer assembly.

11. The transducer assembly of claim 10, the filter circuit further comprising parallel diodes arranged with reversed-polarity in parallel with the voltage-controlled resistor, wherein the settling time is predominately attributable to the parallel diodes during transient operation and the settling time is predominately attributable to the voltage-controlled resistor during steady-state operation.

12. The transducer assembly of claim 11, the voltage reference circuit arranged in parallel with the charge pump and configured to provide a fixed reference voltage to the voltage-controlled resistor, wherein a gain of the voltage reference circuit is different than a gain of the charge pump.

13. The transducer assembly of claim 12, the voltage-controlled resistor comprising a PMOS device having a gate coupled to the output of the voltage reference circuit, the PMOS device having a source and drain coupled between the output of the charge pump and the output of the filter circuit, wherein the gain of the voltage reference circuit is less than the gain of the charge pump.

14. The transducer assembly of claim 12, the voltage-controlled resistor comprising an NMOS device having a gate coupled to the output of the voltage reference circuit, the NMOS device having a source and drain coupled between the output of the charge pump and the output of the filter circuit, wherein the gain of the voltage reference circuit is greater than the gain of the charge pump.

15. The transducer assembly of claim 11, further comprising:
a switched-capacitor resistor circuit disposed between the output of the charge pump and the filter circuit, wherein the switched-capacitor resistor circuit suppresses AC noise from the charge pump to the filter circuit.

16. The transducer assembly of claim 15 further comprising a low frequency filter between the voltage reference circuit and the filter circuit.

17. The transducer assembly of claim 11, the bias circuit having a larger bandwidth during transient operation than during steady-state operation.

18. The transducer assembly of claim 17, the parallel diodes having a lower resistance during transient operation than during steady-state operation.

19. An integrated circuit for a transducer assembly comprising a shielded housing within which the integrated circuit is electrically connectable to a MEMS motor and to a host-device interface on an exterior of the housing, the integrated circuit comprising:
a DC bias circuit comprising a charge pump having an output coupled to a filter circuit, the filter circuit having an output connectable to the MEMS motor, the filter circuit comprising:
a voltage-controlled resistor between an output of the charge pump and the output of the filter circuit; and
parallel diodes arranged with reversed-polarity in parallel with the voltage-controlled resistor; and
a capacitor coupled to the voltage-controlled resistor opposite the charge pump;
a voltage reference circuit arranged in parallel with the charge pump and configured to provide a fixed reference voltage to the voltage-controlled resistor, wherein a settling time during transient operation is predominately attributable to the parallel diodes and the settling time during steady-state operation is predominately attributable to the voltage-controlled resistor.

20. The integrated circuit of claim 19, the voltage-controlled resistor comprising a PMOS device having a gate coupled to the output of the voltage reference circuit, the PMOS device having a source and drain coupled between the output of the charge pump and the output of the filter circuit, wherein a gain of the voltage reference circuit is less than a gain of the charge pump.

21. The integrated circuit of claim 20 further comprising:
   a switched-capacitor resistor circuit disposed between the output of the charge pump and the filter circuit, wherein the switched-capacitor resistor circuit suppresses AC noise from the charge pump to the filter circuit; and
   a low frequency filter between the voltage reference circuit and the filter circuit.

* * * * *